United States Patent Office 2,972,518
Patented Feb. 21, 1961

2,972,518

METHOD OF SIMULTANEOUSLY PREPARING SULFUR TETRAFLUORIDE AND HALO-METHANES

William Arthur Sheppard, Wilmington, Del., assignor to E. I. du Pont de Nemours and Company, Wilmington, Del., a corporation of Delaware No Drawing. Filed Feb. 4, 1958, Ser. No. 713,088

8 Claims. (Cl. 23—205)

This invention relates to a new process for the synthesis of sulfur tetrafluoride and halomethanes, particularly, chlorofluoromethanes.

The process of the invention provides a new and simple method for synthesizing in one step two classes of industrially valuable products. One product, sulfur tetrafluoride, is a highly reactive intermediate which is useful in preparing fluorocarbons. It can be employed, for example, in the manufacture of the technically valuable tetrafluoroethylene by reaction with carbon at high temperatures as described in U.S. 2,709,186. The second group of products, the halomethanes, more particularly, chlorofluoromethanes, are widely employed as refrigerants and as propellants in aerosols.

These products have generally been prepared heretofore by processes which require careful attention because of the corrosive nature of the reactants. For example, the published processes for the preparation of sulfur tetrafluoride are dependent ultimately on the use of elemental fluorine. These processes, which are described by Brown and Robinson, J. Chem. Soc., 1955, 3147–51, are expensive and are not readily adapted to large scale production.

Chlorofluoromethanes are generally prepared by processes which require the use of hydrogen fluoride in the presence of selected catalysts. In these processes not all of the fluorine used in the operation necessarily appears in the desired products; some of it may be found in less valuable by-products.

A process has now been found for preparing both sulfur tetrafluoride and halomethanes which avoids many of the disadvantages of the previously used processes. The new process consists in reacting a fluoride of an alkali metal whose atomic number lies between 11 and 55, inclusive, with carbon disulfide and chlorine in a closed vessel at a temperature of at least 125° C. In the operation of the process, substantially all of the fluorine is found in the sulfur tetrafluoride and the chlorofluoromethanes. The alkali metal fluoride is converted to an alkali metal chloride but the exact mechanism by which this reaction proceeds is not known.

More specifically, the alkali metal fluoride, carbon disulfide and chlorine are reacted under anhydrous conditions in the substantial absence of oxygen at a temperature lying between about 125° C. and about 700° C. Excessively high temperatures are not needed and offer no advantages. A preferred temperature range of operation from the standpoint of obtaining good yields of both sulfur tetrafluoride and halomethanes is between about 200° and 500° C.

The process is preferably operated at superatmospheric pressures although such pressures are not essential for operability. The pressure employed in a batch process is generally autogenous and usually lies between about 5 and 50 atmospheres, however, pressures outside this range can also be used.

The reactants employed in the process are well known relatively low cost chemicals which are generally available on a commercial scale. The alkali metal fluorides which are employed are the fluorides of group I–A metals whose atomic numbers lie between 11 and 55, inclusive, that is, sodium, potassium, rubidium and caesium. Sodium and potassium fluorides are preferred because of availability and low cost. Mixtures of alkali metal fluorides can be used, for example, mixtures of sodium and potassium fluorides or caesium and potassium fluorides are operable. It is not essential to use alkali metal fluorides of high purity; commercial grades of the reactants can be employed. Carbon disulfide and chlorine of commercial grade can also be used in the process without special purification.

The molar ratio in which the reactants are used is not critical for operability of the process. For optimum results, that is, for maximum yields of desired products, the alkali metal fluoride is preferably used in excess. The numerical value of the molar ratio, alkali metal fluoride/carbondisulfide, can lie between about 1 and about 40. The preferred value of this ratio lies between about 10 and about 25. The numeral value of the molar ratio, chlorine/carbon disulfide, will generally lie between about 2 and about 20. The preferred value of this ratio lies between about 4 and 15. Since the chlorine reactant appears in the by-product alkali metal chloride as well as in the chlorofluoromethanes, the chlorine is preferably used in an amount sufficient to react with the carbon disulfide and the alkali metal fluoride.

The reaction can be conducted by either a batch or continuous flow process. In either method, the reaction is preferably conducted under anhydrous conditions in a closed vessel which is resistant to chemical attack by hydrogen fluoride. The reaction vessel is generally lined with a corrosion-resistant material such as platinum or various types of stainless steel.

The time required for the reaction will be determined to a large extent by the type of process employed, that is, whether continuous or batch, and the temperature of the operation. In a continuous flow process in which the gaseous reactants are passed over the alkali metal fluoride, the time of reaction is short, on the order of a second or less and unreacted components can be, and usually are, recirculated to obtain maximum conversion to the desired products. In a batch process, the reactants are maintained in contact with each other for a sufficient period to effect maximum conversion to the desired products, a period which will generally lie between about 2 hours and about 24 hours.

In the operation of the process, the reaction vessel is preferably flushed with a dry inert gas to remove traces of moisture and air. Examples of inert gases which can be used are nitrogen, argon or helium. In a batch process, the reaction vessel is charged with the alkali metal fluoride and carbon disulfide and then with chlorine. The reaction vessel is closed and heated, preferably with agitation by any suitable means, under autogenous pressure. Agitation can be accomplished mechanically by shaking the entire vessel or by a motor or magnetically driven stirrer. Heating can be accomplished by conventional and well known methods. The reactants can be heated slowly by a stepwise procedure wherein the reactants are maintained for short periods of time at progressively higher temperatures. This procedure permits smooth operation of the process and avoids sudden increases in pressure in the reaction vessel. However, this procedure is not essential for operability and the reactants can, if desired, be heated in one step to the reaction temperature.

In an optional variation in the process, the chlorine can be charged into the reaction vessel in two steps. In this procedure approximately half of the calculated amount of chlorine is added in the first step and the reactants heated for a period of time after which the remaining quantity of chlorine is added to the reaction mixture. This procedure results in a lower initial operating pressure in the reaction vessel.

The process can also be conducted in the presence of iodine as a catalyst. The employment of the catalyst can lead to increased yields of desired products at somewhat lower temperatures of operation. However, the use of a catalyst is not essential for operability and the desirability of its use is determined primarily by economic factors.

The process can also be conducted by a continuous flow method, as stated earlier, wherein gaseous chlorine and carbon disulfide are passed into a reaction tube which is charged with an alkali metal fluoride and which is heated to a temperature sufficient to effect reaction. Generally, higher temperatures are needed in a continuous flow process than in a batch process since the former process is normally conducted at atmospheric pressure or at pressures only moderately higher than atmospheric.

The products obtained in the reaction are sulfur tetrafluoride and mixtures of halomethanes. The halomethanes are principally chlorofluoromethanes, that is, monochlorotrifluoromethane, dichlorodifluoromethane and trichlorofluoromethane with minor quantities of carbon tetrafluoride. The principal halomethanes obtained in the process, therefore, have the general formula $CF_xCl_{4-x}$ in which $x$ is a positive whole integer whose value is 1-4, that is, 1, 2, 3, or 4. The ratio in which the products are obtained is not constant but, in general, trichlorofluoromethane and dichlorodifluoromethane are obtained in largest quantities and predominate in the reaction mixtures.

The products of the reaction are collected and purified by conventional procedures. They can, for example, be collected in corrosion-resistant vessels which are cooled to a low temperature with liquid nitrogen or liquid helium. The products can then be purified by known methods such as distillation through a low temperature fractionating unit.

The following examples, in which quantities are expressed as parts by weight, illustrate the process of the invention. In each of the examples, a vessel (capacity, 500-1000 parts of water) is used which is lined with "Hastelloy" C and capable of withstanding pressure. "Hastelloy" C is a well known chemically-resistant alloy of nickel, iron and molybdenum.

In each of the examples, the yield of sulfur tetrafluoride is based on the sulfur available in the reaction from the carbon disulfide and the yield of halomethanes is based on the carbon available in the reaction from the carbon disulfide.

*Example I*

A pressure vessel is flushed with nitrogen and then charged with 15.2 parts of carbon disulfide and 119 parts of sodium fluoride. The vessel is closed, cooled with solid carbon dioxide and evacuated to 1 to 2 mm. pressure. It is then charged with 86 parts of chlorine. The molar ratio of the reactants, carbon disulffide/sodium fluoride/chlorine, is 1.0/1.4/6.0. The vessel is sealed and heated at a rate of temperature rise of 20°/hr. with shaking to 150° C. After heating for 6 hours at 150° C., the vessel is cooled to room temperature (about 25° C.) and the volatile products of the reaction vessel are vented into a stainless steel cylinder which is cooled in liquid nitrogen. There is obtained 49.5 parts of volatile products which are analyzed by mass spectrometric methods. The yield of sulfur tetrafluoride is found to lie between about 83 and 95 percent. The approximate yield of halomethanes is as follows: trichlorofluoromethane, 4%; carbon tetrachloride, 13%. There is left in the reaction vessel 163 parts of a solid by-product. These data show that there is a 67% conversion of chlorine into desired products.

*Example II*

Using the procedure described in Example I, a mixture of 15.2 parts of carbon disulfide, 123 parts of sodium fluoride and 86 parts of chlorine is heated for 2 hours at 100° C., 2 hours at 130° C., 2 hours at 160° C. and 4 hours at 180° C. There is obtained 68 parts of volatile products which are analyzed by mass spectrometric methods. Approximate yields are as follows: sulfur tetrafluoride, 80-90%; dichlorodifluoromethane, 15-20%; trichlorofluoromethane, 75-90%. There is left in the reaction vessel 157 parts of a solid by-product. These data show that there is a 76% conversion of chlorine into desired products.

*Example III*

Using the procedure described in Example I, a mixture of 15.2 parts of carbon disulfide, 115 parts of sodium fluoride, and 86 parts of chloride is heated for 2 hours at 200° C., 2 hours at 230° C., and 6 hours at 250° C. The molar ratio of reactants, carbon disulfide/sodium fluoride/chlorine is 1.0/13.0/6.0. There is obtained 69 parts of volatile products. Approximate yields, obtained from mass spectrometric analysis, are as follows: sulfur tetrafluoride, 80-95%; trichlorofluoromethane, 33-38%; dichlorodifluoromethane, 60-65%; chlorotrifluoromethane, 3-6%. A small amount of carbon tetrafluoride is also obtained. There remains in the reaction chamber 146 parts of a solid by-product. The data show that there is an 81% conversion of chlorine to desired products.

*Example IV*

Using the procedure described in Example I, a mixture of 15.2 parts of carbon disulfide, 126 parts of sodium fluoride and 86 parts of chlorine is heated for 6 hours at 350° C. The molar ratio of reactants, carbon disulfide/sodium fluoride/chlorine is 1.0/15.0/3.0. There is obtained 66.2 parts of volatile products. Approximate yields, based on mass spectrometric analysis, are 88-100% of sulfur tetrafluoride, 6-9% chlorotrifluoromethane, and 73-80% of dichlorodifluoromethane. There remains in the reaction vessel 157 parts of solid by-product. The data show that there is obtained a 63% conversion of chlorine to desired product.

*Example V*

Using the procedure described in Example I, a mixture of 15.2 parts of carbon disulfide, 121 parts of sodium fluoride and 86 parts of chlorine is heated for 6 hours at 400° C. The reaction mixture is brought to this reaction temperature as rapidly as possible. The molar ratio of reactants, carbon disulfide/sodium fluoride/chlorine is 1.0/14.0/6.0. Volatile products recovered in this reaction weigh 5.7 parts, a considerable portion being lost through a leak. The approximate yields of products are as follows: 56% of sulfur tetrafluoride, 30% of chlorotrifluoromethane and 7% of dichlorodifluoromethane. There is left in the reaction vessel 152 parts of solid by-products. The data show a 79% conversion of chlorine to desired products.

The preceding examples illustrate the process in which the alkali metal fluoride is sodium fluoride. The following example illustrates the process using potassium fluoride as the alkali metal.

*Example VI*

Using the procedure described in Example I, a mixture of 15.2 parts of carbon disulfide, 162 parts of potassium fluoride and 86 parts of chlorine is heated for 4 hours at 200° C., using a rate of heating to provide a temperature rise of 20° C. per hour. The molar ratio of reactants, carbon disulfide/potassium fluoride/chlorine, is 1.0/14.0/6.0. There is obtained 86 parts of volatile products. The approximate yields of products are as follows: 8-12% of sulfur tetrafluoride, 1% of chlorotrifluoromethane, 3% of dichlorodifluoromethane and 75–83% of trichlorofluoromethane. There is also obtained 1–3% of carbon tetrachloride. There remains in the reaction vessel 187 parts of solid by-products. The data show that a 28% conversion of chlorine to desired products is obtained.

*Example VII*

This example illustrates the use of a catalyst in the process.

The procedure used is similar to that described in Example I, except that the chlorine is charged into the reaction mixture in two steps. In the first stage of the reaction, a mixture of 15.2 parts of carbon disulfide, 127 parts of sodium fluoride, 43 parts of chlorine, and 0.5 part of iodine is heated for 2 hours at 200° C. There is then charged into the reaction vessel an additional 43 parts of chlorine and the mixture is heated 6 hours at 250° C. The final molar ratio of the reactants, carbon disulfide/sodium fluoride/chlorine, is 1.0/15.0/6.0. There is obtained from the reaction mixture 94.7 parts of volatile products. The approximate yields of products are as follows: 71% of sulfur tetrafluoride, 27% of trichlorofluoromethane and small amounts of carbon tetrafluoride, chlorotrifluoromethane and dichlorodifluoromethane. There remains in the reaction vessel 158 parts of solid by-products. These data show a 70% conversion of chlorine to desired products.

I claim:

1. A process for producing sulfur tetrafluoride and halomethane of the formula $CF_xCl_{4-x}$ where $x$ has a value of 1–4, comprising reacting carbon disulfide, chlorine and a fluoride of an alkali metal whose atomic number lies between 11 and 55 inclusive at a temperature of at least 125° C.

2. The process of claim 1 wherein the alkali metal fluoride is sodium fluoride.

3. The process of claim 1 wherein the alkali metal fluoride is potassium fluoride.

4. The process of claim 1 carried out in the presence of a catalyst.

5. A process comprising reacting carbon disulfide, chlorine and a fluoride of an alkali metal whose atomic number lies between 11 and 55 inclusive in a closed vessel under a pressure of at least 5 atmospheres and at a temperature of at least 125° C.

6. The process of claim 5 wherein the alkali metal fluoride is sodium fluoride.

7. The process of claim 5 which is carried out at a pressure of between about 5 to 50 atmospheres and at a temperature between about 125° and 700° C.

8. The process of claim 5 wherein the molar ratio of alkali metal fluoride to carbon disulfide lies between about 1 and 40 and the molar ratio of chlorine to carbon disulfide lies between about 2 and 20.

References Cited in the file of this patent

UNITED STATES PATENTS

| | | |
|---|---|---|
| 2,104,695 | Gleave | Jan. 4, 1938 |
| 2,709,184 | Muetterties | May 24, 1955 |

OTHER REFERENCES

Brown et al.: "Chemical Society Journal," pt. 3, 1955, 3147–3151.